US012618510B2

(12) United States Patent (10) Patent No.: US 12,618,510 B2

Swicegood (45) Date of Patent: May 5, 2026

(54) GAME FEEDER HOOK AND HOIST APPARATUS

(71) Applicant: Timothy G. Swicegood, Alma, KS (US)

(72) Inventor: Timothy G. Swicegood, Alma, KS (US)

( * ) Notice: Subject to any disclaimer, the term of this patent is extended or adjusted under 35 U.S.C. 154(b) by 0 days.

(21) Appl. No.: 18/217,846

(22) Filed: Jul. 3, 2023

(65) Prior Publication Data

US 2024/0271748 A1 Aug. 15, 2024

Related U.S. Application Data

(60) Provisional application No. 63/358,371, filed on Jul. 5, 2022.

(51) Int. Cl.
| | |
|---|---|
| F16M 13/02 | (2006.01) |
| A01K 5/00 | (2006.01) |

(52) U.S. Cl.
CPC ............. F16M 13/022 (2013.01); A01K 5/00 (2013.01)

(58) Field of Classification Search
CPC ... B66D 1/04; B66D 1/12; B66D 1/60; B66D 3/02; B66D 3/04; B66D 3/18; B66D 3/20; B66D 2700/0116; B66D 2700/023; B66D 2700/025; B66C 1/36; B66C 1/38; B66C 23/203; B66C 1/34; A63B 27/00; A63B 27/02; A01K 5/00; A01M 31/006;

A01M 31/02; A01M 31/025; A22B 5/06; F16M 13/02; F16M 13/022; A01G 23/099; E06C 7/12; E06C 7/083; H02G 1/02
See application file for complete search history.

(56) References Cited

U.S. PATENT DOCUMENTS

| | | | | | |
|---|---|---|---|---|---|
| 3,167,345 | A | * | 1/1965 | Dukes ........................ | B66C 1/38 |
| | | | | | 294/82.31 |
| 4,239,188 | A | * | 12/1980 | Hobbs ........................ | B66D 1/60 |
| | | | | | 414/23 |
| 4,290,584 | A | * | 9/1981 | Eckels ..................... | B66F 11/04 |
| | | | | | 242/390.8 |
| 4,767,144 | A | * | 8/1988 | Hornberg .............. | F16B 45/033 |
| | | | | | 24/599.7 |
| 5,395,284 | A | * | 3/1995 | Frisk ........................ | A22B 5/06 |
| | | | | | 452/187 |

(Continued)

FOREIGN PATENT DOCUMENTS

| | | | | | |
|---|---|---|---|---|---|
| CN | 105429046 | A | * | 3/2016 | |
| CN | 109969935 | A | * | 7/2019 | .............. B66C 1/36 |

(Continued)

*Primary Examiner* — Anna M Momper
*Assistant Examiner* — Henrix Soto
(74) *Attorney, Agent, or Firm* — Dale J. Ream

(57) ABSTRACT

A feeder hoist and hook apparatus includes a limb frame assembly having an inverted U-shaped configuration to nest on a tree limb until actuated for removal. The apparatus includes an actuation linkage that includes a linear gear and torsion spring that cooperate to open or close a latch bar. The feeder hoist and hook apparatus may include a hoist assembly having a spool and cord for incrementally lifting a game feeder into the air when actuated. The feeder hoist and hook apparatus may be actuated with a telescoping actuation pole, using a drill, or using remote control.

14 Claims, 8 Drawing Sheets

(56) References Cited

U.S. PATENT DOCUMENTS

| | | | | |
|---|---|---|---|---|
| 5,417,609 A * | 5/1995 | Oldham | .................. | A22B 5/06 |
| | | | | 452/187 |
| 5,787,536 A * | 8/1998 | Pate | .................... | B25H 1/0028 |
| | | | | 30/296.1 |
| 6,739,964 B2 * | 5/2004 | Gearhart | ................. | A22B 5/06 |
| | | | | 452/187 |
| 7,458,563 B1 * | 12/2008 | Liu | ...................... | A01M 31/02 |
| | | | | 254/335 |
| 7,784,768 B2 * | 8/2010 | LaFreniere | ............. | B66D 3/26 |
| | | | | 254/364 |
| 7,976,085 B1 * | 7/2011 | Neaton | .................... | B66C 1/36 |
| | | | | 294/103.1 |
| 2011/0260127 A1 * | 10/2011 | Surgeon | .................. | B66D 3/26 |
| | | | | 254/362 |
| 2019/0112168 A1 * | 4/2019 | Hall | ....................... | B66D 1/225 |
| 2020/0138009 A1 * | 5/2020 | Schultheiss | .............. | E04G 3/32 |
| 2022/0010619 A1 * | 1/2022 | Parker | ................... | E06C 7/505 |

FOREIGN PATENT DOCUMENTS

| | | | | | | |
|---|---|---|---|---|---|---|
| CN | 110722291 A | * | 1/2020 | ........... | B23K 37/006 |
| DE | 4423335 A1 | * | 1/1996 | .............. | B66C 1/36 |
| DE | 202016100459 U1 | * | 5/2017 | .............. | B66C 1/36 |
| EP | 580058 A1 | * | 1/1994 | .............. | B66D 1/04 |
| FR | 2874906 A3 | * | 3/2006 | .............. | B66D 3/18 |
| SU | 1477651 A | * | 5/1989 | | |

* cited by examiner

2

20

30

39

6b

42

44

47

4

40

52

GAME FEEDER HOOK AND HOIST APPARATUS

REFERENCE TO RELATED APPLICATIONS

This application claims the benefit of provisional patent application No. 63/358,371 filed Jul. 5, 2022 and titled Game Feeder Hook and Hoist Apparatus which is incorporated herein in its entirety.

BACKGROUND OF THE INVENTION

This invention relates generally to game feeders and, more particularly, to a hoist for lifting and positioning a game feeder above a ground surface.

Feeding game animals on a regular and repeated basis prior to actually hunting and harvesting the game animals, such as using a rifle or bow, is well known. The goal, of course, is for the game animals to become accustomed to finding feed at a predetermined location and on a regular basis so that the game animals are likely to approach that location even when a hunter has set up nearby for the purpose of shooting one of the animals.

An advantageous method for feeding game animals is to suspend the feeding hopper in the air above a feeding location such that hopper is unlikely to be disturbed by animals or humans. Then the hopper can be programmed. In other embodiments, however, the hoist may be operable from the ground which enables unauthorized access. Another undesirable issue is that securing the feeding hopper to a tree limb is difficult and must be repeated with each filling.

Therefore, it would be desirable to have a feeder hoist and hook apparatus having a limb frame assembly configured to nest on a tree limb and to selectively capture, raise, and release a game feeder. Further, it would be desirable to have a feeder hoist and hook apparatus for incrementally lifting a game feeder into the air when actuated. In, addition, it would be desirable to have a feeder hoist and hook apparatus that is actuated with a telescoping actuation pole.

SUMMARY OF THE INVENTION

A feeder hoist and hook apparatus according to the present invention includes a limb frame assembly including a framework having an upper portion that is internally rounded and a pair of opposing and parallel side arms extending downwardly from opposed ends of the upper portion. The apparatus includes a limb actuation linkage having (1) a linkage frame member coupled to the limb frame assembly and (2) a latch actuation member having an intermediate section coupled to the linkage frame member with a torsion spring and a distal end opposite the intermediate section. Accordingly, the latch actuation member is movable between a deployed configuration displaced from the linkage frame member and a released configuration adjacent the linkage frame member.

In another aspect, the feeder hoist and hook apparatus includes a hoist assembly having a hoist housing in communication with the framework of the limb assembly and that defines an interior area. The hoist assembly includes a spool rotatably mounted in the interior area and having a cord wound about the spool.

Therefore, a general object of this invention is to have a feeder hoist and hook apparatus having a limb frame assembly configured to selectively secure and release a game feeder relative to a limb frame assembly.

Another object of this invention is to have a feeder hoist and hook apparatus that includes a hoist coupled to the limb frame assembly and configured for incrementally lifting a game feeder into the air or lowering it to the ground when actuated.

A further object of this invention is to have a feeder hoist and hook apparatus, as aforesaid, in which operation of a latch bar associated with the limb frame assembly and operation of said hoist are actuated by use of a telescoping pole.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is a front view of the hoist and hook apparatus as in FIG. 1, illustrated with the latch bar in a closed configuration;

FIG. 2b is an isolated view on an enlarged scale taken from FIG. 2a;

FIG. 3a is a front view of the hoist and hook apparatus as in FIG. 2a, illustrated with the latch bar in an open configuration;

FIG. 3b is an isolated view on an enlarged scale taken from FIG. 3a;

FIG. 4a is a perspective view of the hoist and hook apparatus as in FIG. 1, illustrated with the telescopic pole being operated by a drill;

FIG. 4b is an isolated view on an enlarged scale taken from FIG. 4a;

FIG. 5a is a perspective view of a hoist and hook apparatus according to another embodiment of the present invention;

FIG. 5b is an isolated view on an enlarged scale taken from FIG. 5a;

FIG. 6a is a perspective view of the hoist and hook apparatus as in FIG. 5a, illustrated with the hoist being actuated by a drill;

FIG. 6b is an isolated view on an enlarged scale taken from FIG. 6a;

FIG. 7 is a perspective view of a tree mounting member according to the apparatus shown in FIG. 5a;

FIG. 8b is a perspective view of a remote control according to the apparatus shown in FIG. 8a.

DESCRIPTION OF THE PREFERRED EMBODIMENT

Figure 1:
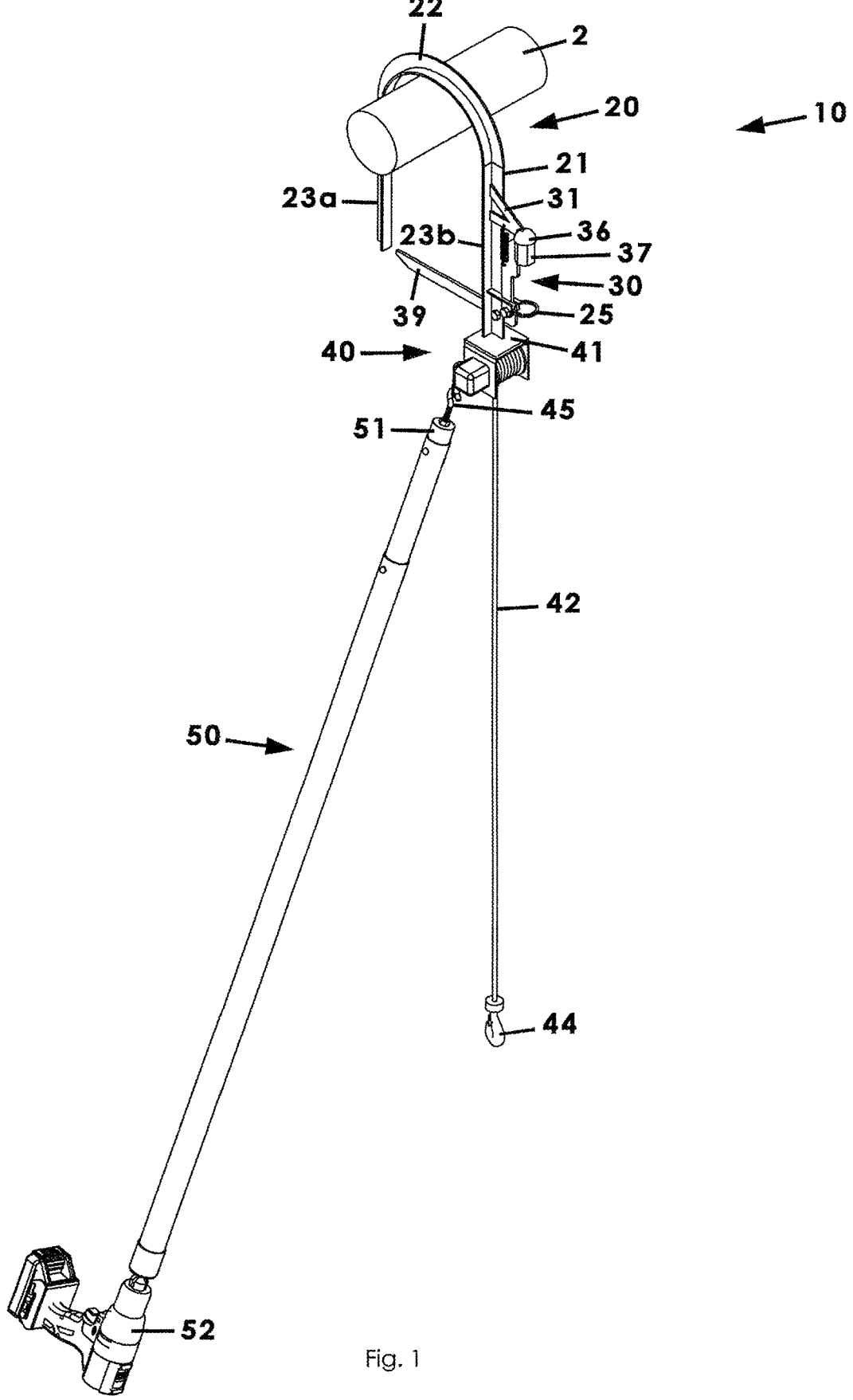
FIG. 1 is a perspective view of a hoist and hook apparatus according to a preferred embodiment of the present invention.

A feeder hoist and hook apparatus according to a preferred embodiment of the present invention will now be described with reference to FIGS. 1 to 8b of the accompanying drawings. The feeder hoist and hook apparatus 10 includes a limb frame assembly 20, a limb actuation linkage 30, a hoist assembly 40, and, in an embodiment, a telescopic pole 50.

The limb frame assembly 20 includes a framework 21 having an inverted U-shaped configuration such that an upper portion 22 is configured to nest with and, essentially hang from a branch 2 of a tree (FIG. 1). In other words, the upper portion 22 of the framework has an internally rounded and closed configuration complementary to the configuration of a medium sized tree branch 2. By contrast, the framework 21 includes a pair of opposing and parallel side arms 23a, 23b extending downwardly from the upper portion 22 that, together, define a lower portion 24 (a.k.a., a bottom) that is selectively opened or closed upon operation of the actuation linkage 30.

The actuation linkage 30, amongst other elements, includes a latch bar 39 that is pivotally movable between a closed configuration (FIG. 2) blocking access to an open center area defined collectively by the framework 21 and an open configuration (FIG. 3) allowing access into the open center area. As will be understood, the latch bar 39 may be moved to the open configuration when positioning the limb frame assembly 20 on a limb or releasing it therefrom and then moved to the closed configuration to inhibit its inadvertent release. In an embodiment, movement of the latch bar 39 involves operation of the telescopic pole 50.

More particularly, the actuation linkage 30 may include a linkage frame member 31 coupled to a first arm 23b of the pair of side arms 23 and a latch actuation member 32 having an intermediate section 32a operatively coupled to the linkage frame member 31 with a tension spring 33 or similar elastic and resilient fastener and a distal end 32b displaced from the first end pivotally and operatively coupled to a first end 39a of the latch bar 39. In operation, a downward movement of the latch actuation member 32 causes a pivotal movement of the latch bar 39 toward the open configuration as represented by FIG. 3 whereas an upward movement of the latch actuation member 32 causes a pivotal movement of the latch bar 39 toward the closed configuration as illustrated in FIG. 2. It is understood that the resilience of the tension spring 33 assists in returning the latch actuation member 32 to its unactuated configuration.

Figures 3A, 3B:
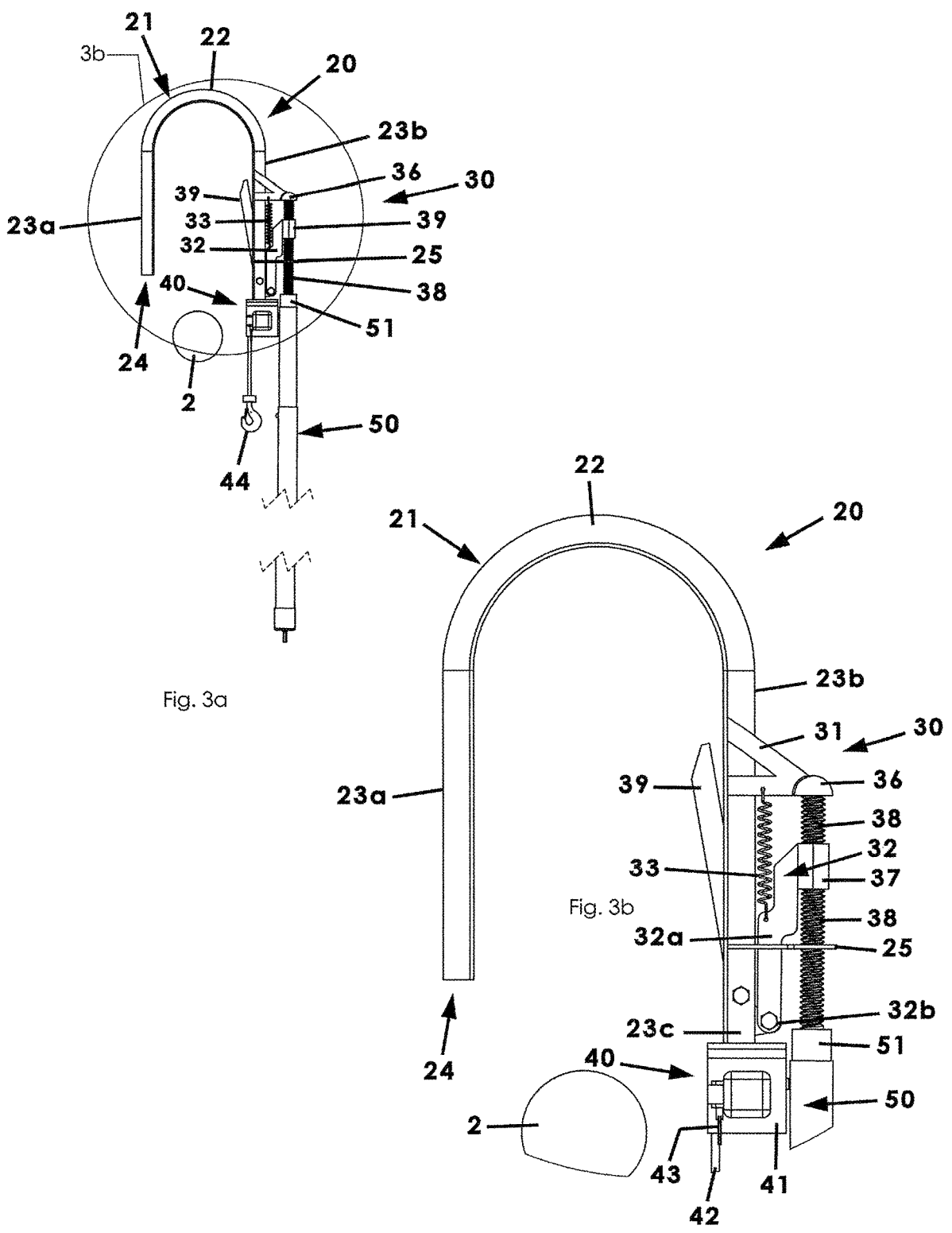
Figures 4A, 4B:
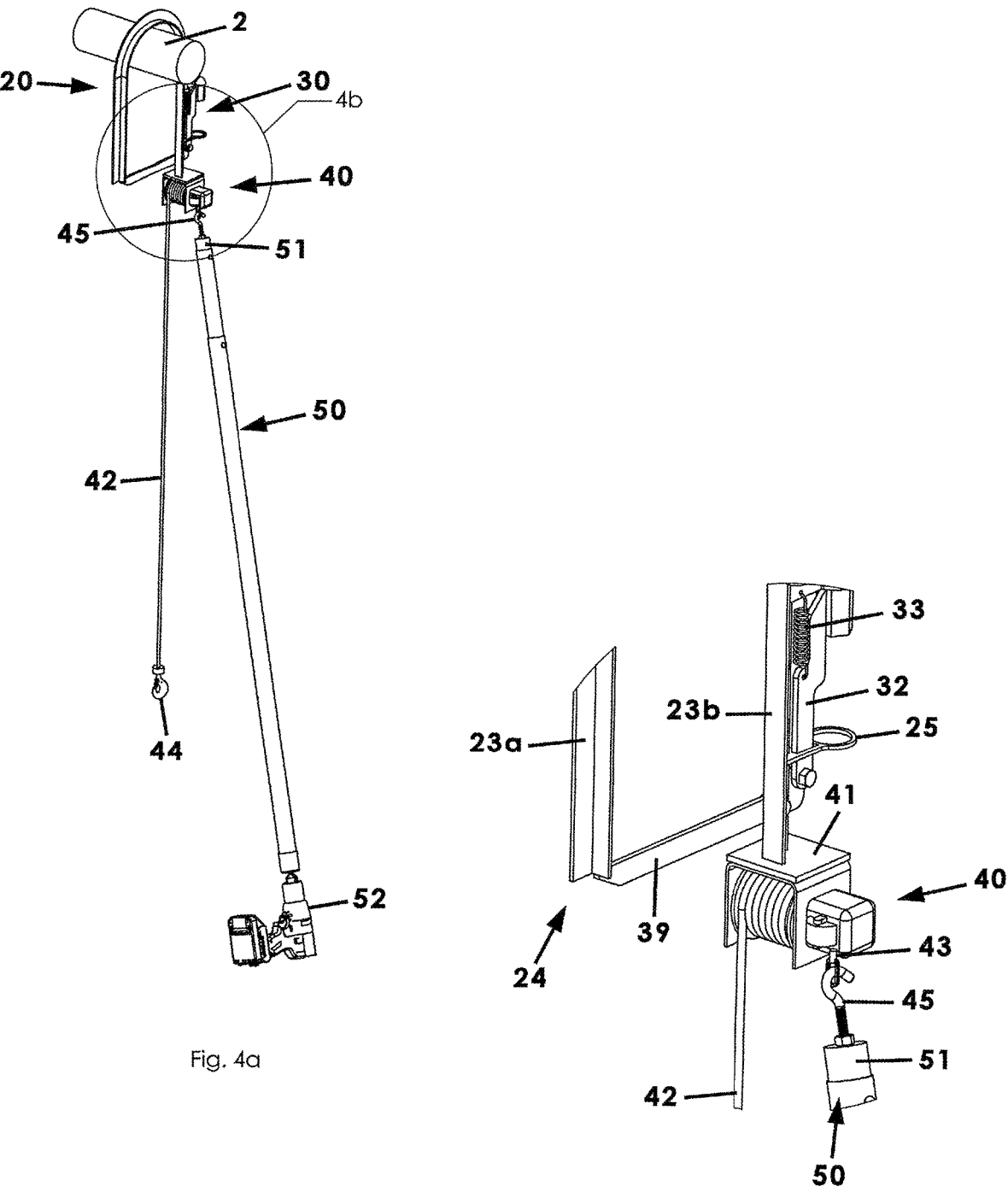
Figures 5A, 5B:
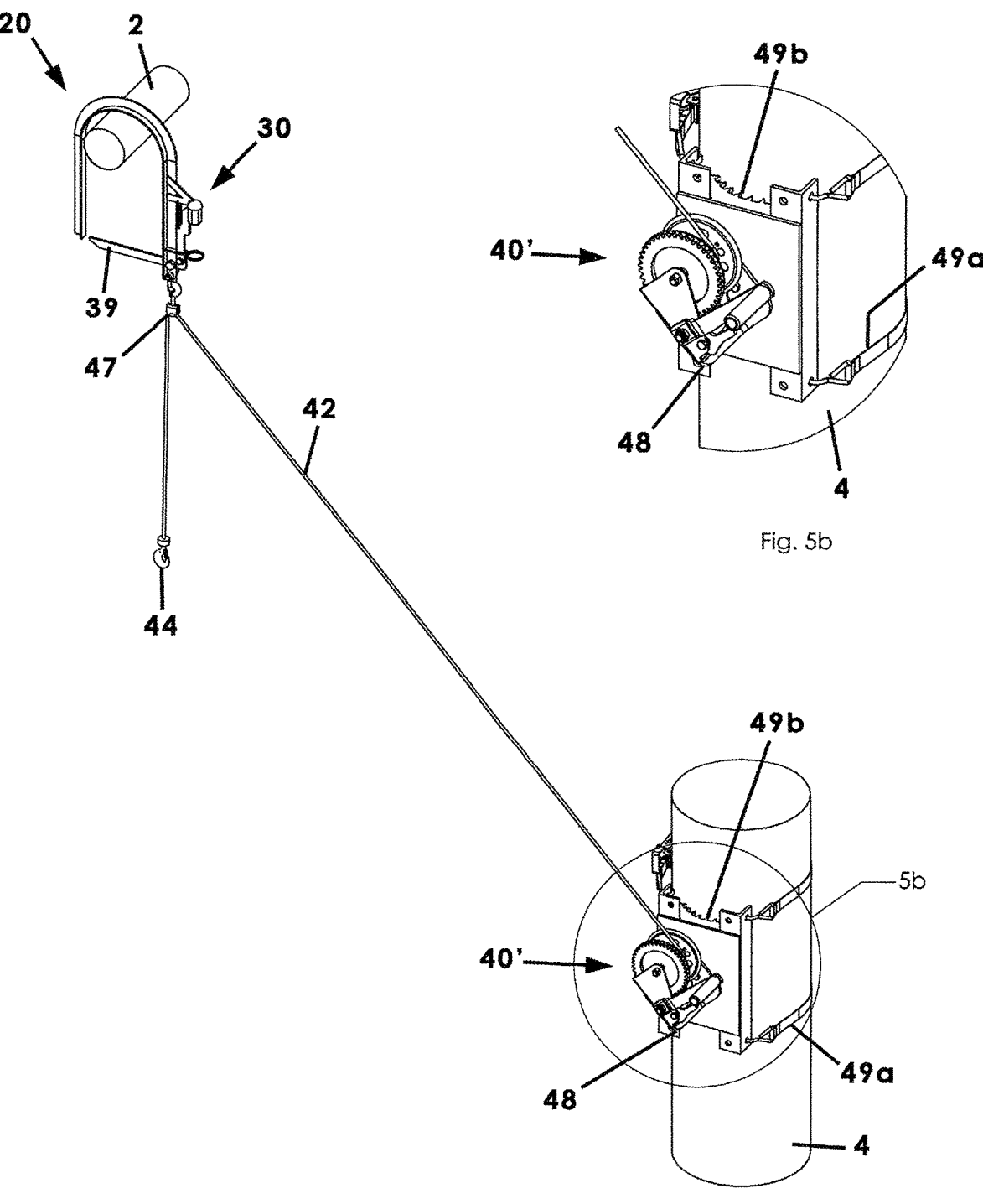
Figures 6A, 6B:
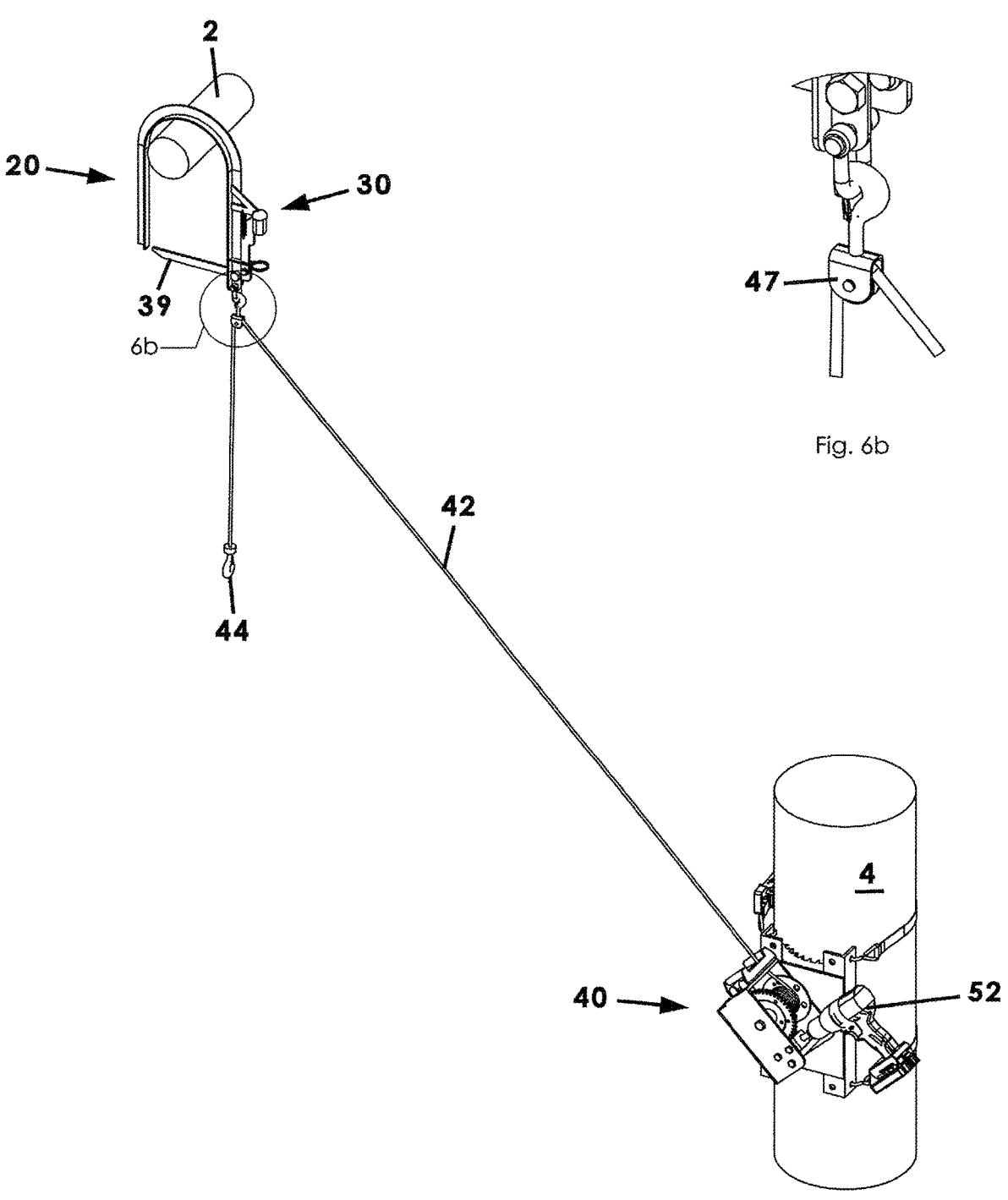
Figure 7:
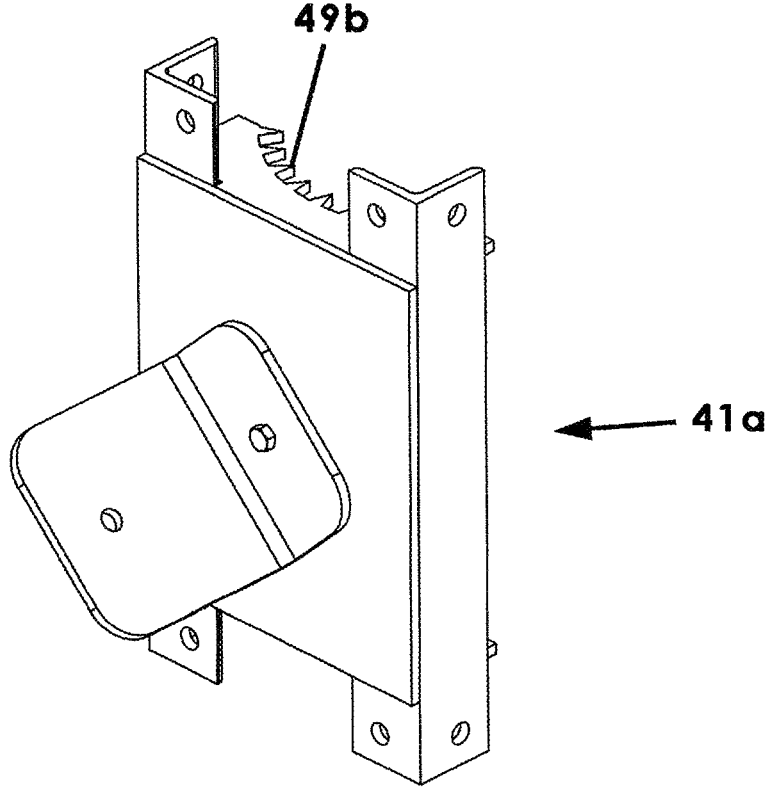
Figure 8A:
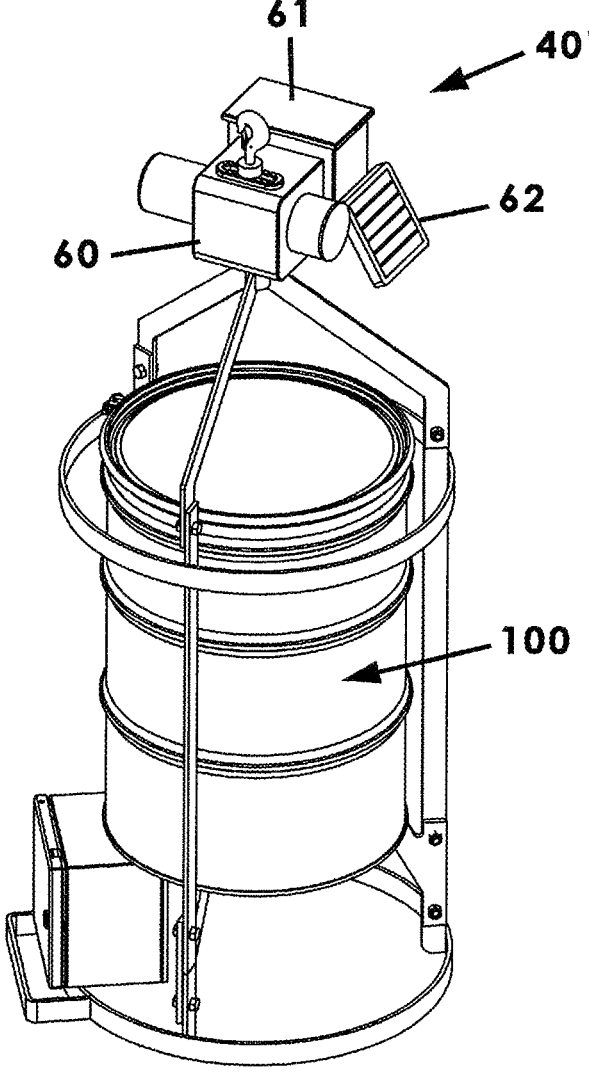
FIG. 8a is a perspective view of a hoist and hook apparatus according to another embodiment of the present invention.
Figure 8B:

The actuation linkage 30 also includes a means for actuating and causing up/down movement of the latch actuation member 32 and, as a result, pivotal operation of the latch bar 39 between open and closed configurations. In an embodiment, the means for actuating includes a pole cup 36, an actuation nut 37, and a pole screw 38 (i.e., a linear gear), it being understood that the actuation nut 37 has an internal threaded surface complementary to an exterior thread pattern of the pole screw 38 such that rotation of the pole screw through the actuation nut 37 causes movement of the nut 37 along the longitudinal axis defined by the pole screw 38. Of critical importance is that the actuation nut 37 is fixedly coupled to the actuation latch member 32 such that a movement of the actuation nut 37 causes a proportional and directional movement of the latch actuation member 32 (FIG. 3b). In short, a simultaneous and incremental downward movement of the actuation nut 37 and latch actuation member 32 results in a proportional and opposite movement of the latch bar 39.

Figures 2A, 2B:
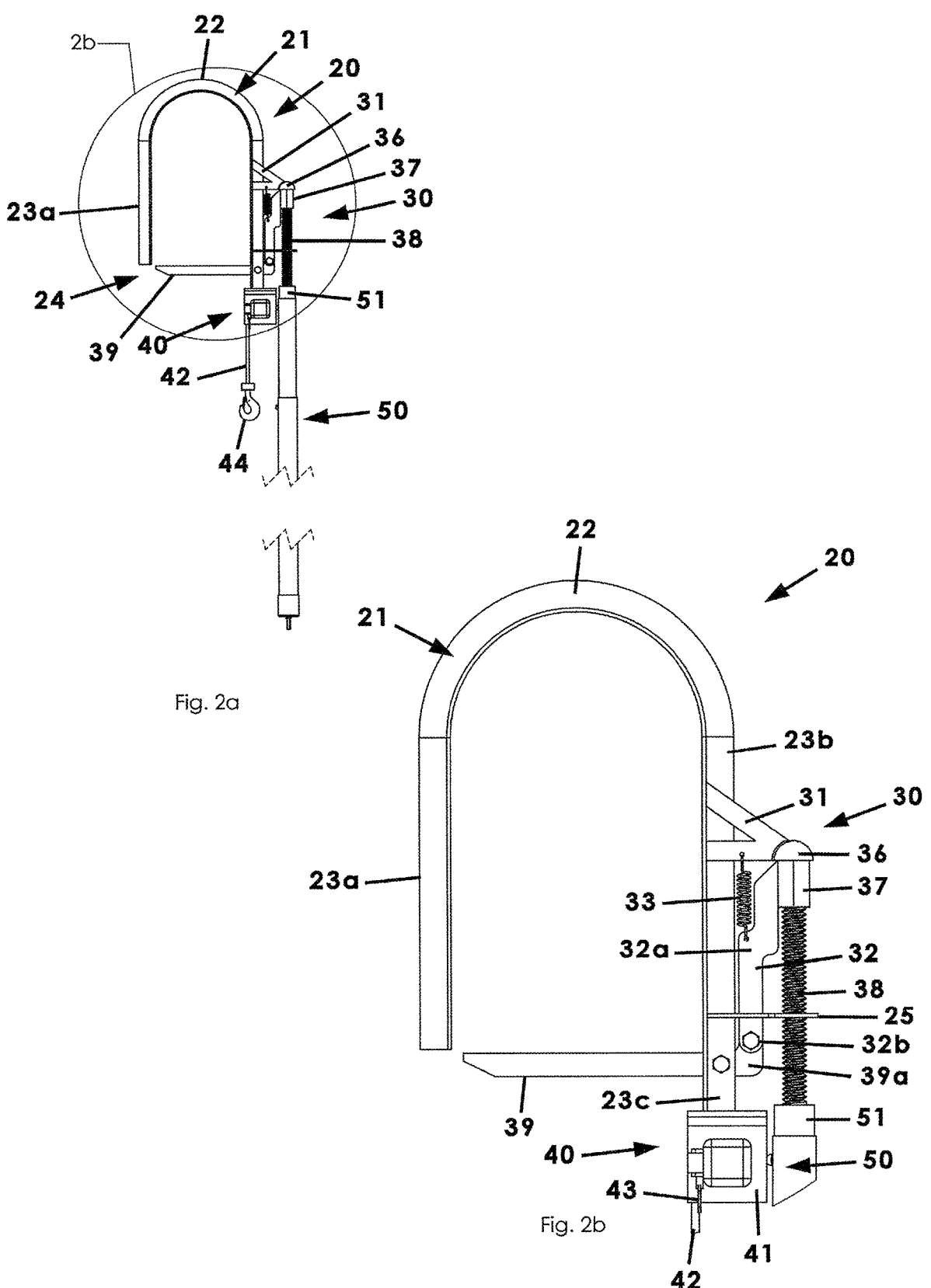

In an embodiment, a distal end of the pole screw 38 may be coupled to a tip of the telescopic pole 50 and then inserted into the interior space of the actuation nut 37. The telescopic pole 50 may also be referred to generically as an actuation pole. To aid in this remote engagement, the actuation linkage 30 may include an alignment ring 25 through which the pole screw 38 is inserted upstream of engaging the actuation nut 37 (FIGS. 2b and 3b).

In another aspect, the feeder hoist and hook apparatus 10 includes a hoist assembly 40 operatively coupled to the limb frame assembly 20. Preferably, the hoist assembly 40 is coupled to the same side of the limb frame assembly 20 that includes the actuation linkage 30. More particularly, the hoist assembly 40 may include a housing 41 inside of which is positioned a spool 47 about which a cord 42 (or cable or rope) is wound and which may be wound and unwound as the spool 47 is rotatably actuated. In an embodiment, the hoist assembly 40 may include an input member 43 such as a switch, lever, pull-chain, gear, or linkage in mechanical communication with the spool 47. For instance, an actuation of the input member 43 may be configured to reel in or reel out the cord 42, respectively. In addition, a free end of the cord 42 may include an input hook 44, carabiner, or similar fastener that is configured to attach to a frame of a game feeder 100 or the like. In an embodiment, the spool may be operatively coupled to a spring (not shown) that may be biased in a direction of reeling in the cord 42. Similarly, the input member 43 may be in data communication with a motor coupled to the spool and configured to actuate the same. Accordingly, operation of the spool 47, cord 42, and overall hoist assembly 40 is the means for lifting the game feeder 100 into the air from which feed may be regularly dispensed.

In an embodiment, the hoist assembly 40 may be actuated manually from the ground using the telescopic pole 50. More particularly, an actuation member 45 such as a hook may be attached to a tip 51 of the telescopic pole 50, the actuation member having a configuration complementary to that of the input member 43 and configured to mate therewith. Accordingly, an actuation of the tip 51 and actuation member 45 causes the spool to reel in or reel out the cord 42, respectively. In an embodiment, the telescopic pole 50 in its entirety or at least the tip 51 thereof (such as via an internal linkage) so as to lift a feeder into the air or release it to the ground depending on the direction of manual rotation. In another embodiment, the telescopic pole 50 may be operatively connected to a drill 52 which provides the rotation and actuation described above (FIG. 4a).

If desired by a user, an alternative embodiment of the hoist assembly 40' may be mounted to a tree trunk 4 (FIG. 5), such as with a mounting plate 41a having ratchet straps 49a and teeth 49b that bite into the tree 4. The alternative hoist assembly 40' may include a pulley 47 coupled to the framework 21 of the limb frame assembly 20 about which the cord 42 may be routed. Actuation of the spool may be manual (such as using a hand crank 48) (FIG. 5) or using a drill 52 (FIG. 6a) for hoisting or releasing a feeder 100.

In still another embodiment, a hoist assembly 40" is substantially the same as described initially except as noted below. In this embodiment, the hoist assembly 40" may include a motor situated in a motor housing 60 for powering a spool using current from a battery 61, a solar cell 62, or the like. This embodiment may also include transmitter and receivers configured to enable operation of the hoist assembly 40" via a remote control 63.

In another embodiment, the limb frame assembly 20 has a construction that is substantially similar to the limb frame assembly 20 first described above, i.e., the limb frame assembly 20 includes a framework 21 having an inverted U-shaped configuration such that an upper portion 22 is configured to nest with and, essentially hang from a branch 2 of a tree (FIG. 1). In other words, the upper portion 22 of the framework has an internally rounded and closed configuration complementary to the configuration of a medium sized tree branch 2. By contrast, the framework 21 includes a pair of opposing and parallel side arms 23a, 23b extending downwardly from the upper portion 22 that, together, define a lower portion 24 (a.k.a., a bottom) that is always open. Different, however, than as previously described, the actuation linkage 30 does not include a latch bar to selectively close the open bottom. In other words, the limb frame assembly 20 is always configured to nest with a branch 2 of a tree.

Further, this alternative embodiment may include further alterations to the actuation linkage 30. Namely, the pole cup 36 may be fixedly coupled to the actuation nut 37 and this structure may have a fixed construction, i.e., the actuation nut 37 is not movable or rotatable. By contrast, the pole screw 38 is configured to rotate threadably upwardly through the actuation nut 37 until stopped by the pole cup 36 which has a closed top. Still further, in this embodiment, the latch actuation member 32 is not urged downwardly and no tension spring 33 is needed to return the latch actuation member to a raised configuration. In use, the telescopic actuation pole 50 may be utilized with the pole screw 38 to engage the actuation nut 37/pole cup 36 combination and thereby raise and nest the limb frame assembly 20 with a limb 2 as described above.

It is understood that while certain forms of this invention have been illustrated and described, it is not limited thereto except insofar as such limitations are included in the following claims and allowable functional equivalents thereof.

The invention claimed is:

1. A feeder hoist and hook apparatus, comprising:
a limb frame assembly including a framework having an upper portion that is internally rounded and a pair of opposing and parallel side arms extending downwardly from opposed ends of said upper portion;
a limb actuation linkage having (1) a linkage frame member coupled to the limb frame assembly and (2) a latch actuation member having an intermediate section coupled to said linkage frame member with a resilient fastener and a distal end opposite said intermediate section such that said latch actuation member is movable between a deployed configuration displaced from said linkage frame member and a released configuration adjacent said linkage frame member;
a latch bar having a first end pivotally coupled to the distal end of said latch actuation member such that said latch bar is pivotally movable, when urged by movement of said latch actuation member, between an open configuration allowing access to an interior area defined by said framework and a closed configuration blocking access to the interior area;
wherein said limb actuation linkage includes:
    a linear gear positioned adjacent said latch actuation member and having an external thread pattern;
    an actuation nut having an internal thread pattern and being operatively coupled to said linear gear such that a rotation of said linear gear causes longitudinal movement of said actuation nut along said linear gear;
    wherein said actuation nut is fixedly attached to said latch actuation member such that said longitudinal movement of said actuation nut along said linear gear urges said latch actuation member toward said deployed configuration or said released configuration, respectively;
an actuation pole that includes a telescopic construction and that includes a tip having a configuration that is complementary to a distal end of said linear gear such that said linear gear is actuated to rotate when said tip of said actuation pole is coupled to said distal end of said linear gear and rotated.

2. The feeder apparatus as in claim 1, wherein said latch bar is pivotally movable toward said open configuration when said latch actuation member is urged toward said deployed configuration.

3. The feeder apparatus as in claim 1, wherein:
said upper portion and said pair of side arms, together, define an inverted U-shaped configuration;
said upper portion is configured to receive a tree branch in a nested configuration.

4. The feeder apparatus as in claim 1, wherein said fastener is a tension spring that is configured to stretch when said latch bar is urged toward said open configuration and that is biased to urge said latch bar toward said closed configuration when released.

5. The feeder apparatus as in claim 1, further comprising:
a hoist assembly having a hoist housing coupled to said framework that defines an interior area, said hoist assembly including a spool rotatably mounted in said interior area and having a cord wound about said spool;
an input member situated on said hoist housing and that is in communication with said spool, said input member being operable to release or reel in said spool, respectively.

6. The feeder apparatus as in claim 1, further comprising:
a hoist assembly having a hoist housing coupled to a respective side wall of said framework of said limb frame assembly and that defines an interior area, said hoist assembly including a spool rotatably mounted in said interior area and having a cord wound about said spool; and
an input member situated on said hoist housing and that is in communication with said spool, said input member being operable to release or reel in said spool, respectively.

7. The feeder apparatus as in claim 6, wherein said hoist assembly includes a motor in mechanical communication with said spool and in data communication with said input member, said spool being actuated when said motor is energized.

8. The feeder apparatus as in claim 1, further comprising:
a hoist assembly having a mounting plate displaced from said framework and that includes a plurality of teeth configured to adhere to a tree,
said hoist assembly includes a spool rotatably mounted to said mounting plate and a cord wound about said spool;
an actuation member in communication with said spool that is configured to reel in and reel out said spool, respectively;
a pulley coupled to said framework of said limb frame assembly and displaced from said mounting plate, said pulley being configured to receive said cord.

9. A feeder hoist and hook apparatus, comprising:
a limb frame assembly including a framework having an upper portion that is internally rounded and a pair of opposing and parallel side arms extending downwardly from opposed ends of said upper portion;
a limb actuation linkage having (1) a linkage frame member coupled to the limb frame assembly and (2) a latch actuation member having an intermediate section coupled to said linkage frame member with a tension spring and a distal end opposite said intermediate section such that said latch actuation member is movable between a deployed configuration displaced from said linkage frame member and a released configuration adjacent said linkage frame member;
a latch bar having a first end pivotally coupled to the distal end of said latch actuation member such that said latch bar is pivotally movable, when urged by movement of said latch actuation member, between an open configuration allowing access to an interior area defined by said framework and a closed configuration blocking access to the interior area;

a hoist assembly having a hoist housing in communication with said framework of said limb frame assembly and that defines an interior area, said hoist assembly including a spool rotatably mounted in said interior area and having a cord wound about said spool;

an actuation pole that includes a telescopic construction and that includes a tip having a configuration that is complementary to a distal end of a linear gear such that said linear gear is actuated to rotate when said tip of said actuation pole is coupled to said distal end of said linear gear and rotated.

10. The feeder apparatus as in claim 9, wherein said limb actuation linkage includes:

a pole screw positioned adjacent said latch actuation member and having an external thread pattern;

an actuation nut having an internal thread pattern and being operatively coupled to said pole screw such that a rotation of said pole screw causes longitudinal movement of said actuation nut along said pole screw;

wherein said actuation nut is fixedly attached to said latch actuation member such that said longitudinal movement of said actuation nut along said pole screw urges said latch actuation member toward said deployed configuration or said released configuration, respectively.

11. The feeder apparatus as in claim 9, wherein said tension spring is configured to stretch when said latch bar is urged toward said open configuration and that is biased so as to urge said latch bar toward said closed configuration when released.

12. The feeder apparatus as in claim 9, wherein:

said hoist housing is coupled to said framework of said limb frame assembly;

said hoist assembly includes an input member situated on said hoist housing and that is in communication with said spool, said input member being operable to reel in or reel out said spool, respectively.

13. The feeder apparatus as in claim 12, wherein said hoist assembly includes a motor in mechanical communication with said spool and in data communication with said input member, said spool being actuated when said motor is energized.

14. The feeder apparatus as in claim 13, wherein said motor is actuated by remote control.

\* \* \* \* \*